March 24, 1964   H. G. DAVIES   3,125,884
TESTING APPARATUS
Filed May 17, 1962   2 Sheets-Sheet 2

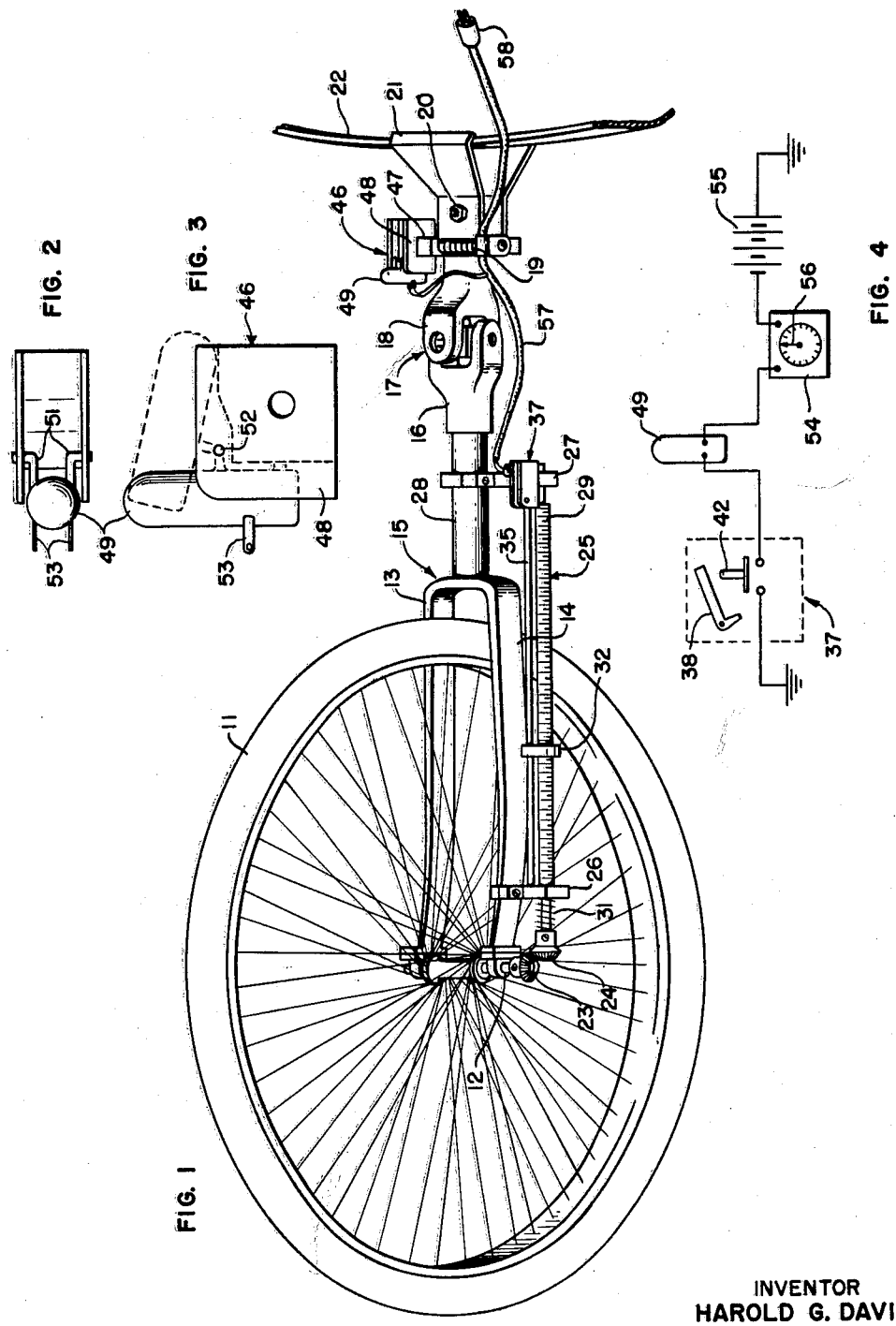

INVENTOR
HAROLD G. DAVIES
BY *Roy A. Dotson*
ATTORNEY

United States Patent Office 3,125,884
Patented Mar. 24, 1964

3,125,884
TESTING APPARATUS
Harold G. Davies, 208 E. North St., Plano, Ill.
Filed May 17, 1962, Ser. No. 195,632
3 Claims. (Cl. 73—514)

This invention relates to testing apparatus and more particularly to apparatus for testing acceleration capabilities of self-propelled vehicles.

A primary object of the invention is to provide an improved means for running a timed test of acceleration of a self-propelled vehicle over a measured course.

Another object of the invention is to provide an arrangement for determining accurately the elapsed time between the initial movement of a self-propelled vehicle and its traversal over a predetermined measured distance.

Another object of the invention is to provide an elapsed time indicator for a vehicle traversing a measured course from a standing start.

A further object of the invention is to provide an electrical circuit means for automatically controlling the starting and stopping of a timing device during a test acceleration run.

A still further object of the invention is to determine automatically the traversal time of a vehicle over a measured course during an acceleration test run.

More specifically, the principle purpose of the device according to the present invention is to provide a means for measuring accurately the total elapsed time of travel of a vehicle from a standing start over a distance of a quarter of a mile. Obviously, the measured distance may be any predetermined distance along a course which is either straight or curved. Although the use of a fifth wheel to measure certain kinds of performance of a vehicle is known, the feature of the fifth wheel according to this invention resides in a unique method of measuring a predetermined distance, and also measuring accurately the elapsed time from start to finish of a test run. A principal component of the measuring device according to this invention is a threaded rod or shaft disposed at a ninety degree angle to the axle of the wheel, which axle is mounted rigidly to the wheel so as to rotate therewith. Said axle drives the threaded shaft through a set of bevel gears having a ratio of 1 to 1. A specially formed nut is mated with this threaded shaft and is constrained to travel the length of the shaft as the wheel is rotated. The "traveling" nut is prevented from rotating with the threaded shaft by an auxiliary guide rod extending substantially the entire length of the threaded shaft and disposed parallel therewith.

A better understanding of the invention may be had by reference to the following description when read in conjunction with the accompanying drawings, wherein:

FIG. 1 is a perspective view of the testing apparatus according to the present invention;

FIG. 2 is a top view of the start switch employed with the testing apparatus;

FIG. 3 is a side elevational view of the start switch shown in FIG. 2;

FIG. 4 is a schematic diagram of the electrical circuit used with the present invention;

Figure 5:
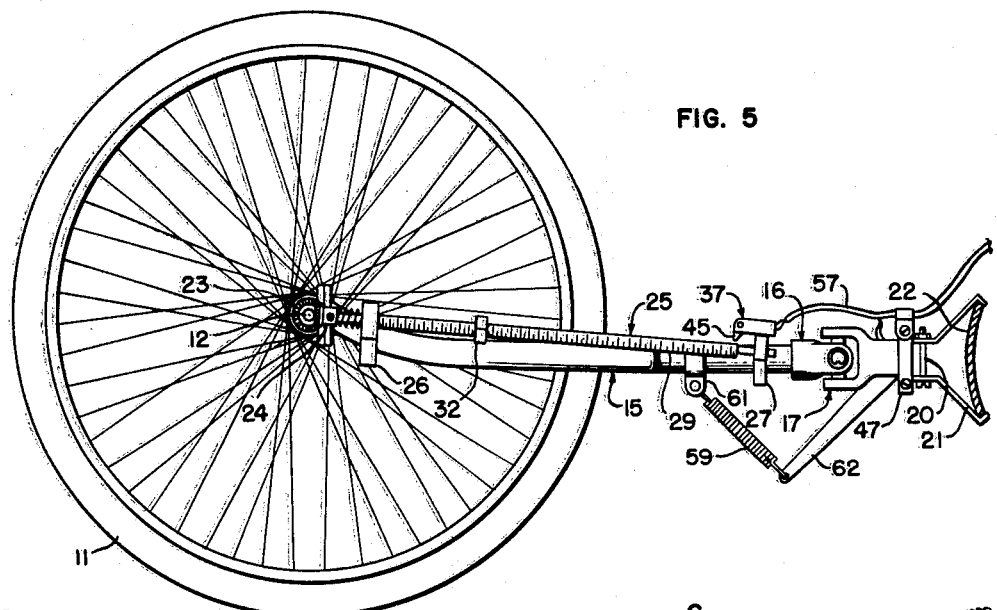
FIG. 5 is a side elevational view of the testing apparatus.
Figure 6:
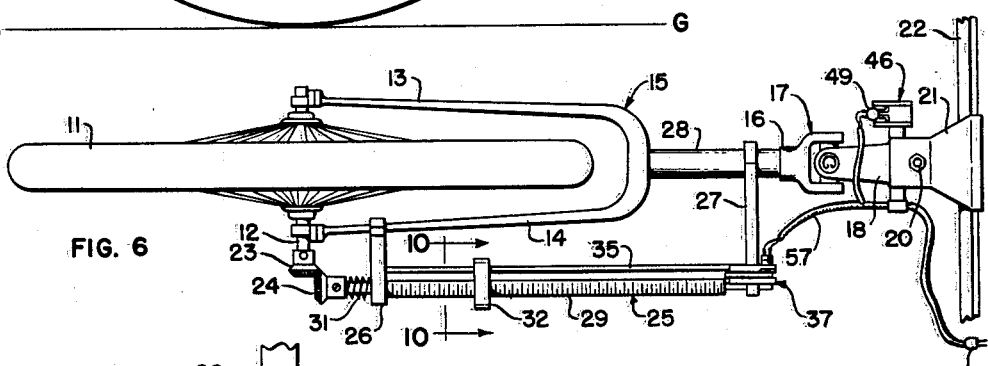
FIG. 6 is a top view of the testing apparatus.
Figure 7:
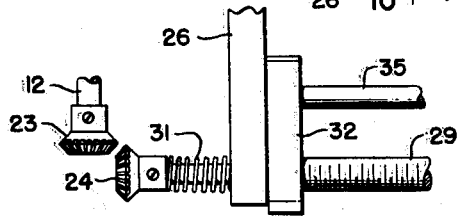
FIG. 7 is a fragmental view showing one condition of operation of the bevel gear driving connection of testing apparatus.

Having reference to FIGS. 1, 5 and 6 of the drawings, the testing apparatus according to the present invention comprises in a preferred embodiment thereof, a single trailing wheel 11 (for example, of the type used on bicycles). Rigidly attached to the wheel 11 so as to rotate therewith is an axle 12 which is suitably journaled in the ends of arms 13 and 14 of a fork 15. The end 16 of fork 15 forms a component part of a universal coupling 17, the portion 18 of which is hingedly related at 19 to a bumper hitch 21 of well-known construction, which is attachable in well-known manner to an automobile bumper 22. As illustrated in FIG. 5, the bumper hitch 21 is securely clamped to the bumper 22 by means of a clamping bolt 20, whereby the bumper hitch 21 and the portion 18 of the universal coupling 17 become a rigid and integral unit.

The axle 12 extends beyond the fork arm 14 (as shown in FIGS. 1 and 6), and fixed to said axle 12 is a bevel gear 23. In meshing relation with bevel gear 23 is a corresponding bevel gear 24 which is fixed to a shaft 25 disposed substantially perpendicular to the axle 12 and parallel to the longitudinal axis of the fork 15. The shaft 25 is appropriately carried by the brackets 26 and 27, bracket 26 being secured to arm 14 and bracket 27 being secured to the shank 28 of the fork 15. The shaft 25 comprises a threaded section 29 of somewhat larger diameter than the end portions thereof which are journaled in the supports 26 and 27. Encircling the reduced end of shaft 25 between the bracket 26 and the bevel gear 24 is a helical compression spring 31 which functions to maintain the bevel gears 23 and 24 normally in meshing relation.

Figure 10:
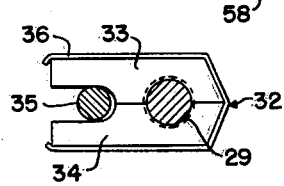
FIG. 10 is a view showing the construction of the traveling nut, taken on line 10—10 of FIG. 6.

Carried on the threaded section 29 is a specially formed nut 32 of the form, for example, as shown in FIG. 10, which comprises two substantially symmetrical parts or halves 33 and 34 adapted to fit over the threaded section 29 and a guide rod 35 supported at its ends by brackets 26 and 27 and disposed parallel to the shaft 25. The halves 33 and 34 of the nut 32 are held together by a spring clip 36 that fits around the outside of the nut 32. The nut 32 is thus mated with the threaded section 29 and is constrained to travel along the length of the threaded section 29 as the wheel 11 is rotated to communicate its movement through bevel gears 23 and 24 to the shaft 25. The nut 32 will be hereinafter referred to as the traveling nut 32.

Figure 8:
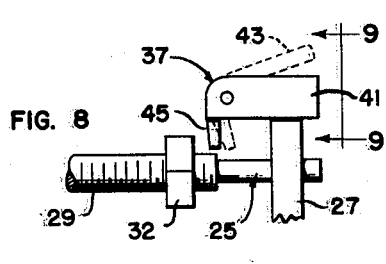
FIG. 8 is a fragmental view showing the stop switch for the testing apparatus.
Figure 9:
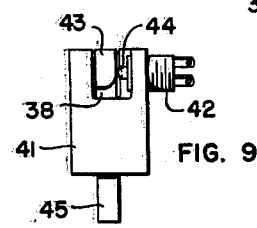
FIG. 9 is an enlarged view taken on line 9—9 of FIG. 8.

Suitably supported on bracket 27 in cooperative relationship with shaft 25 and traveling nut 32 is a stop switch 37, FIGS. 1, 5 and 6. As shown in FIGS. 8 and 9, the stop switch 37 comprises a bell crank lever 38 pivotally mounted at 39 in a frame 41 secured to the bracket 27 in any appropriate manner. As illustrated in FIG. 9, the frame 41 supports a push button switch 42. The arm 43 of bell crank lever 38 is adapted to depress the push button 44, FIG. 9, whereby the switch 42 is placed in a circuit closing condition, with the depending arm 45 of bell crank lever 38 presented in the path of the traveling nut 32, FIG. 8. Thus, as the shaft 25 is rotated to move the traveling nut 32 rightwardly, as viewed in FIG. 8, the traveling nut 32 will impinge against the arm 45 to rotate the bell crank lever 38 to its counterclockwise position (dotted line position in FIG. 8) to release the push button 44 of switch 42, thereby placing the switch 42 in its open circuit condition.

Referring to FIG. 1, a start switch 46 is suitably carried on a bracket 47 secured to the portion 18, and comprises a frame 48 for pivotally mounting a mercury switch 49. As illustrated in FIGS. 2 and 3, the mercury switch 49 is provided with a pair of arms 51 by means of which it is pivotally supported at 52 by the frame 48. As is well known, mercury switch 49 is sensitive to its position; that is, in the solid line or vertical position in FIG. 3, the mercury gravitates to the bottom of the tube and closes or short circuits the terminal contacts 53, and when the switch is rotated to its dotted line position, the mercury flows away from its contacts 53 and thus the electrical circuit is opened. To put the mercury start switch 46 in the ready position, the switch 46 is placed in a nearly horizontal position, but tilted just enough off the horizontal plane to allow the mercury to flow to the end of the switch away from the electrical contacts. In this position the contacts are open circuited. Upon the initial lurch of the vehicle at the start of the acceleration run, the mercury switch 49 is forced into a vertical position allowing the mercury to flow to the contact end of the switch, causing the electrical contacts to be short circuited.

The start switch 46 and stop switch 37 are connected in series with a time clock 54 which is shown diagrammatically in FIG. 4, wherein the circuit extends from grounded battery 55, through the time clock 54, then through mercury switch 49 (when closed), through stop switch 37 (when closed) thence to ground. The time clock 54 is of well known construction and is not shown in detail, it being of the type in which the indicating hand 56 begins to move to indicate elapsed time when the circuit is closed, and stops whenever the circuit is broken. The cable 57 contains the conductors for connecting the switches 37 and 46 to the time clock 54 and battery 55 so that the switches 37 and 46 and time clock 54 are properly connected in series as indicated in FIG. 4.

As shown in FIG. 5, a spring 59 is distended between a bracket 61 secured to the fork 15 and an arm 62 integral with the portion 18, the function of which is to keep the fifth wheel from bouncing off of the pavement over a rough course.

The operation of the testing apparatus according to the present invention is as follows: Attach the testing apparatus (FIG. 1) to the bumper 22 of the vehicle to be tested and plug the cable 57 into the time clock 54. Detach the traveling nut 32 from the threaded section 29 by removing the clip 36 and replace the halves 33 and 34 at the starting end of the threaded section 29, which is in juxtaposition with the bracket 26, and snap on the clip 36. With the traveling nut 32 thus attached, rotate the wheel 11 backwards until the traveling nut 32 starts to tighten up against the bracket 26 which supports the start end of the shaft 25. With the traveling nut 32 just nudging the bracket 26, it is in the correct position for making the timed acceleration run. To protect the bevel gears 23 and 24 from being damaged in case the wheel 11 is rotated too far in the wrong direction, the shaft 25 is spring loaded, as previously described, by a spring 31, so that when the traveling nut 32 is forced against the bracket 26, the threaded section 29 is forced to unscrew, causing the bevel gear 24 to be withdrawn from meshing engagement with bevel gear 23.

It is important that the traveling nut 32 be started at this exact position every time. With the traveling nut 32 in position, the mercury switch 49 is placed in the open circuited position; namely, the dotted line position shown in FIG. 3 (near horizontal). The stop switch 37 is placed in the circuit closing position (FIG. 9) with the arm 43 depressing the push button 44. At this point the fifth wheel is set up correctly for the timed run.

The initial lurch at the start of the run throws the mercury switch 49 into its vertical or short circuit (circuit closing) position, as shown in FIGS. 1 and 3. Since the start switch 46 and the stop switch 37 are both closed (or short circuited) and both are connected in series with the time clock 54, the time clock 54 has started to operate. As the vehicle progresses down the measured course (quarter mile, in the present example), the traveling nut 32 progresses along the length of the threaded section 29. For example, since the bevel gears 23 and 24 have a ratio of 1 to 1, the gearing of the axle 12 to the shaft 25 is also 1 to 1, and thus the traveling nut is forced along the threaded section 29 of shaft 25 at a rate of one thread per rotation of the wheel 11. Therefore, by dividing the circumference of the wheel 11 into a quarter mile (1320 feet), the number of threads needed, and hence the length of the threaded section 29, can be determined, to give the desired measurement of the quarter mile.

At the end of the quarter mile run, the traveling nut 32 is also at the end of the threaded section 29 adjacent the stop switch 37. The traveling nut 32 thereupon strikes the arm 45 of the stop switch 37 and rotates the bell crank 38 to release the push button 44 to thereby open the aforementioned series circuit to stop the time clock 54. Beyond the threaded section 29 of shaft 25 is a smoothed off area adjacent the stop switch 37 where there are no threads, so that when the traveling nut 32 reaches this area it rides there freely until it is taken off or detached in the aforesaid manner. At the end of the test run, during which it is assumed that everything has operated properly, the elapsed time it has required to traverse the quarter mile (or predetermined measured course) can be read on the time clock 54, which is normally calibrated in seconds.

It is understood that the invention is not limited to the particular embodiment thereof herein illustrated and described, but is capable of other applications within the scope of the appended claims.

What is claimed is:

1. An elapsed-time testing apparatus for association with a vehicle, said apparatus comprising a road engaging wheel other than a wheel of the vehicle and provided with means for ready attachment to and detachment from the vehicle, traversal responsive means comprising a screw shaft and means for communicating motion from said wheel to said shaft, traveling nut means operably associated with said shaft and traversable therealong between predetermined limits, a normally closed swtich cooperating with said traveling nut means, a normally open second switch carried on said apparatus, said second switch balanced to readily respond to the inertial force exerted by said vehicle from a standing start, an electrically controlled time indicating instrument, and an electrical circuit including said instrument and said switches in series, whereby in response to the initial forward lurch of said vehicle from a standing start said second switch will be operated to its circuit closing position to cause the operation of said time indicating instrument until said first recited switch is operated to its open circuit position by said traveling nut means to terminate operation of said time indicating instrument to indicate the elapsed time of traversal of said vehicle over a measured course.

2. An elapsed-time testing apparatus for association with a vehicle, said apparatus comprising a road engaging wheel other than a wheel of the vehicle and provided with means for ready attachment to and detachment from the vehicle, traversal responsive means comprising a threaded shaft and means for communicating motion from said wheel to said shaft, traveling nut means operably associated with said shaft and traversable therealong between predetermined limits commensurate with the rate of movement of said wheel, a normally closed switch cooperating with said traveling nut means, a mercury switch carried on said apparatus, said mercury switch balanced in its open circuit position to readily respond to the inertial force exerted by said vehicle from a standing start, an electrically controlled time indicating device, and an electrical circuit including said device and said switches in series, whereby in response to the initial forward lurch of said vehicle from a standing start said mercury switch will be operated to its circuit closing position to cause the operation of said time indicating device until said normally closed switch is operated to its open circuit position by said traveling nut means to terminate operation of said time indicating device to indicate the elapsed time of traversal of said vehicle over a measured course.

3. In an apparatus for testing the acceleration capabilities of a self-propelled vehicle over a measured course, the combination of a trailing portion comprising a trailing wheel, supporting means for said wheel, an axle fixed to said wheel and journalled in said supporting means, universal connection means for attaching said supporting means to said vehicle, a first bevel gear fixed to an extension of said axle, a second bevel gear having cooperative meshing relation with said first bevel gear, a threaded shaft rotatably carried in journal brackets secured to said supporting means, one end of said shaft fixed to said second bevel gear, a nut carried on said shaft, said nut constrained to travel along said shaft between said journal brackets upon rotation of said shaft, a normally closed switch means cooperable with said traveling nut, said switch means carried on said supporting means adjacent to the other end of said shaft, mercury switch means carried on said supporting means in a normal open circuit position, and a time indicating device electrically connected to said switches in series, whereby in response to the initial forward lurch of said vehicle from a standing start said mercury switch will be operated to its circuit closing position to cause the operation of said time indicating device until said first recited switch means is operated to its open circuit position by said traveling nut to terminate operation of said time indicating device to indicate the elapsed time of traversal of said vehicle over said measured course.

References Cited in the file of this patent
UNITED STATES PATENTS 2,370,141     Brunner  ---------------- Feb. 27, 1945